UNITED STATES PATENT OFFICE.

GILBERT RIGG, OF PALMERTON, PENNSYLVANIA, ASSIGNOR TO THE NEW JERSEY ZINC COMPANY, OF NEW YORK, N. Y., A CORPORATION OF NEW JERSEY.

LIGHT-PROOF LITHOPONE AND PROCESS OF MAKING SAME.

1,260,812. Specification of Letters Patent. Patented Mar. 26, 1918.

No Drawing. Application filed April 28, 1916. Serial No. 94,261.

*To all whom it may concern:*

Be it known that I, GILBERT RIGG, a subject of the King of Great Britain, residing at and whose post-office address is Palmerton, Carbon county, State of Pennsylvania, have invented certain new and useful Improvements in Light-Proof Lithopone and Processes of Making Same; and I do hereby declare the following to be a full, clear, and exact description of the invention, such as will enable others skilled in the art to which it appertains to make and use the same.

The present invention relates to improvements in the manufacture of lithopone, and particularly to the elimination therefrom of zinc sulfate, which I have discovered has a darkening effect upon the lithopone when the latter is exposed to direct sunlight.

I have ascertained that, in the manufacture of lithopone, and in the reaction between the barium sulfid and zinc sulfate employed which results in the production of barium sulfate and zinc sulfid, a small quantity of zinc sulfate is occluded in the precipitate in such intimate association therewith as to amount almost to solid solution in the mass,—to such a degree that it cannot be removed by washing with water within any reasonable or commercially practicable period of time. So also, I have ascertained that in the furnacing of the mixture of barium sulfate and zinc sulfid, which furnacing is incident to the lithopone manufacture, there are frequently produced small quantities of zinc sulfate, which likewise persist with tenacity in the mass.

In order to remove the zinc sulfate, thus intimately associated with the furnaced product, I first subject the furnaced product to a preliminary milling or grinding operation, together with washing, so that the mill water employed will remove any soluble impurities that would otherwise tend to interfere with the reagent employed for subsequently removing the zinc sulfate. I then introduce into the mill in which the furnaced product is being ground in the usual way, a quantity of barium sulfid in amount slightly in excess of that required for the reaction. The mill employed will be either of the pebble type familiar to lithopone manufacture or of the bur-stone type, and is adapted and designed to exercise a squeezing, rubbing, and percussive action upon the furnaced lithopone in the presence of the barium sulfid and the mill water, with the resultant effect that, in spite of the condition of absorption of the zinc sulfate with the other constituents of the furnaced product, it will be brought into the most intimate reacting relationship with the barium sulfid. As a consequence, the zinc sulfate and barium sulfid will react to form barium sulfate and zinc sulfid, which will remain as such in the product.

It will be noted that, by the practice of the invention, not only is the zinc sulfate eliminated as such from the composition, but also that there is added to the composition, and in homogeneous admixture therewith, a further quantity of zinc sulfid and barium sulfate; and, at the same time, all excess of barium sulfid beyond that required for the reaction, is carried away with the mill water. The additional zinc sulfid or barium sulfate thus introduced adds to the covering quality of the lithopone, to the extent to which it is present therein, and is found to be without any countervailing prejudicial effect upon the composition as a whole.

Other soluble sulfids which will decompose zinc sulfate can be substituted for barium sulfid in the process, as, for example, calcium sulfid, strontium sulfid, and the sulfids of the alkali metals, and will, in part, subserve the uses of the invention; although to a lesser extent, for the reason that although suitable for the decomposition of the zinc sulfate, they will not result in the addition to the composition of a further quantity of zinc sulfid and barium sulfate, as in the preferred embodiment of the invention.

Having thus described my invention, what I claim is:

1. The method of producing light-resisting lithopone, which comprises removing any zinc sulfate present therein, by reacting upon the zinc sulfate with a soluble sulfid; substantially as described.

2. The method of producing light-resisting lithopone, which comprises removing any zinc sulfate present therein, by reacting upon the zinc sulfate with barium sulfid; substantially as described.

3. The method of producing light-resisting lithopone, which comprises removing any zinc sulfate present therein, by grinding the mass with a soluble sulfid; substantially as described.

4. The method of producing light-resisting lithopone, which comprises removing any zinc sulfate present therein, by grinding the mass with barium sulfid; substantially as described.

5. The method of producing light-resisting lithopone, which comprises removing from the calcined lithopone soluble materials and then reacting upon the remaining contained zinc sulfate with a soluble sulfid; substantially as described.

6. The method of producing light-resisting lithopone, which comprises removing from the calcined lithopone soluble materials and then removing any zinc sulfate remaining therein by grinding the mass with barium sulfid; substantially as described.

7. A light-resisting lithopone, comprising calcined lithopone having the zinc sulfate contained therein converted into zinc sulfid by treatment with barium sulfid and also containing precipitated barium sulfate; substantially as described.

In testimony whereof I affix my signature.

GILBERT RIGG.

Copies of this patent may be obtained for five cents each, by addressing the "Commissioner of Patents, Washington, D. C."